United States Patent [19]

Holmes

[11] Patent Number: 5,599,716

[45] Date of Patent: Feb. 4, 1997

[54] MEASUREMENT OF RADIOACTIVE CONTENT OF WASTE AND PLANT ITEMS BY RADIOLYTIC TRANSFORMATION OF REACTANT GASES

[75] Inventor: Robert G. G. Holmes, Cumbria, United Kingdom

[73] Assignee: British Nuclear Fuels plc, United Kingdom

[21] Appl. No.: 562,645

[22] Filed: Nov. 27, 1995

Related U.S. Application Data

[63] Continuation of Ser. No. 182,037, filed as PCT/GB93/01001, May 17, 1993 published as WO93/23770, Nov. 25, 1993, abandoned.

[30] Foreign Application Priority Data

May 15, 1992 [GB] United Kingdom .................... 9210455

[51] Int. Cl.$^6$ .................................................. G01M 23/00
[52] U.S. Cl. ........................... 436/57; 436/58; 436/124; 436/125; 436/126; 436/139; 436/141; 436/142; 436/144; 436/161; 436/178
[58] Field of Search ....................... 436/57, 58, 124–126, 436/139, 141, 142, 144, 161, 178

[56] References Cited

U.S. PATENT DOCUMENTS

| | | | |
|---|---|---|---|
| 4,866,277 | 9/1989 | Johnson et al. | 250/385.1 |
| 4,897,221 | 1/1990 | Manchak, Jr. | 252/633 |
| 4,920,270 | 4/1990 | Grodzins | 250/364 |

OTHER PUBLICATIONS

D. V. Bugg *Rev. Sci. Ins.*, 1958, 29, 587–589.
B. Hahn et al. *Rev. Sci. Ins.* 1959, 30, 654–655.
S. Srinivasan et al. *Int. J. Appl. Rad. Isotop.* 1966, 17, 643–647.
A. R. Adderson et al. *Nature* 1967, 216, 576–577.
R. S. Iyer et al. *J. Phys. Chem.* 1981, 85, 2493–2497.
D. I. Thwaites et al. *Chem. Abstr.* 1982, 96, 93677w.
W. K. Schorr et al. *Anal. Chem.* 1982, 54, 671–674.
B. A. Tomkins et al. Anal. Chem. 1989, 61, 2751–2756.
D. I. Thwaites et al. *Comm. Eur. Communities, EUR*, 1981, ELIR 7448, vol. 1, 291–303.
H. Hotta et al. *Chem. Abstr.* 1983, 98, 79772.

*Primary Examiner*—Arlen Soderquist
*Attorney, Agent, or Firm*—Nixon & Vanderhye

[57] ABSTRACT

A process for the measurement of the level of radioactivity of a solid by contacting the solid with a chemically stable reactant fluid. The reactant fluid is converted by nuclear radiation to a chemically stable product fluid to an extent dependent upon the radioactive content of the solid. The amount of the reactant fluid converted into the product fluid is detected in order to determine the level of radioactivity of the solid.

19 Claims, 2 Drawing Sheets

MEASUREMENT OF RADIOACTIVE CONTENT OF WASTE AND PLANT ITEMS BY RADIOLYTIC TRANSFORMATION OF REACTANT GASES

This is a continuation of application Ser. No. 08/182,037, filed as PCT/GB93/01001, May 17, 1993, published as WO93/23770, Nov. 25, 1993, now abandoned.

The present invention relates to the measurement of radioactivity.

In the nuclear industry there is a need to assess and measure accurately the radioactive content of bodies of solid material, eg bulk waste materials produced after nuclear fuel reprocessing, nuclear plant decommissioning, surface decontamination and land remediation activities. Nuclear solid wastes are classified into low level wastes (LLW) and intermediate level wastes (ILW) according to their activity levels. Storage of ILW typically costs 100 times that of LLW; it is therefore commercially attractive to be able to distinguish accurately between ILW and LLW by measurement of the radioactivity of a given sample. Furthermore it is desirable to distinguish between LLW and so-called 'de-minimus' wastes which are wastes whose activity is essentially negligible.

It is the purpose of the present invention to provide a process to measure accurately the radioactivity of a given sample of solid material, eg in order to classify solid waste material as ILW or LLW or as LLW or de-minimus waste.

According to the present invention a process for the measurement of the level of radioactivity of a solid includes the steps of contacting the said solid with a chemically stable reactant fluid which is converted by nuclear radiation to a chemically stable product fluid to an extent dependent upon the radioactive content of the solid and detecting the amount of the reactant fluid converted into the product fluid.

In a first aspect of the present invention the solid may comprise a material which is porous or has re-entrant surfaces and the process of the present invention includes permeating through a sample of the said material a chemically stable volatile reactant gas which is converted by nuclear radiation to a chemically stable volatile product gas.

The said material may comprise bulk solid waste material which is being monitored to determine whether it is ILW, LLW or de-minimus waste as described above. Thus, the present invention provides a method for classifying or assaying solid waste material.

Desirably, the reactant gas is permeated through the sample using a varying pressure, eg using a pump to ensure that the reactant gas breathes into the re-entrant surfaces and contacts any sites of obscured contamination. The sample interrogated by the reactant gas may be contained in a totally or partially sealed container. Where the container is only partially sealed the outleakage is desirably measured. A pressure pulse from the pump is desirably applied at intervals after the initial application of the reactant gas to permit re-circulation through the re-entrant surfaces.

The reactant gas may comprise as simple hydrocarbon or a halogen-substituted hydrocarbon or a mixture of such compounds. Examples of gaseous compounds suitable for use as or as a component of the reactant gas include methane, ethane, ethylene, propane, propene, butane, butane-1, butane-2, methyl bromide, ethyl bromide, hexafluoroethane, trifluoromethane and bromotrifluoromethane.

Bromotrifluoromethane is preferred as the reactant gas. This produces tetrafluoromethane as a product gas when exposed to gamma radiation.

The product gas may comprise a plurality of products produced by irradiation of the reactant gas. This does not affect operation of the invention provided that the relationship between irradiation of the reactant gas and the concentration of the components of the product gas produced thereby is known. This relationship may be known from literature results or may be determined by experimental analysis of calibrant gases or gas.

The relative concentration of the components of the product gas may vary depending on whether the incident radiation comprises alpha, beta or gamma radiation. However, the effect is to produce the same components of the product gas in differing concentrations. For assay purposes, the maximum acceptable concentration level of each of the components is set and in the detection step it is found whether any of the components of the product gas exceeds its maximum acceptable level.

Advantageously, components of the product gas may be concentrated in one or more sample traps by adsorption of a desired component onto a solid such as activated charcoal. Alternatively, less volatile components of the product gas may be trapped using low temperature traps.

Conveniently the sample traps may comprise a U-shaped tube of stainless steel packed with the desired adsorbent.

Desirably, any non-radiolytic depletion of the reactant gas (eg sorption) can be detected using a third gas (an inert gas) mixed with the reactant gas and measuring the relative concentration ratio of the third gas to reactant gas. The third gas may comprise $SF_6$. The third gas, in conjunction with the reactant gas, can be used to measure gas outleakage during the assay.

Furthermore, a stable fourth or internal standard gas, substantially unaffected by the radiation to be detected, is desirably added as or is present as an impurity to the reactant gas in a known concentration of not more than a few parts per million (>20 ppm) to enable the concentration of the product gas to be standardised. The ratio of the concentration of the product gas to that of the internal standard gas provides a normalised measure of the product gas.

The detection of the amount of the reactant gas converted into the product gas may be by one of the techniques well known to those skilled in the field of analytical techniques, such as gas chromatography combined with mass spectrometry (GCMS) or by infra-red (IR) spectroscopy. The signal representative of the concentration of the product gas may be displayed on a paper printer, on a electronic video display unit or in any other suitable way. As noted above the concentration of the product gas or its components may be compared with a previously determined acceptable level and the detector and display may provide an output which indicates whether on the one hand the concentrations of all the components of the product gas are below their acceptable levels or whether on the other hand the concentration of any of the components is above the acceptable level.

The signals produced as outputs by the measurement system, eg GCMS, may be further enhanced by signal processing techniques, eg band pass filtering plus signal to noise enhancement at the known peak values representing the various detected gas components.

A body of material to be assayed by the method according to the first aspect of the present invention is contained in a suitable container and the reactant gas together with the leakage or non-radiolytic depletion measurement gas and the internal standard gas are desirably added to the body of material. The container does not need to be evacuated before addition of the said gases, and a suitable concentration of the added gases is greater than say 30 per cent by volume, desirably greater than 50 per cent by volume, of the total gas (including air) in the container. Where the body comprises a mass of solid waste articles contaminated with radioactive materials, the articles are desirably inspected as they are tipped into the container to search for items such as bottles or cans which are sealed and require further breakage to allow their surfaces to be contacted by the added gases. The container into which they are tipped may for example be a so-called ISO-FREIGHT container having a volume of approximately 35 m$^3$.

After the solid material has been added to the container the added gases are introduced and the container is then sealed to the extent of sealing possible. The container is then left for a suitable period of time, eg from one day to several months, depending on the likely radioactivity levels of the material. During this period, eg every week where the container is stored for a period of several weeks, the gases in the container are re-circulated by applying a pressure pulse. When it is necessary to measure the radioactivity levels a sample of the gas in the container is extracted by a suitable gas suction pump or gas sampling equipment and the sampled gas is made the subject of an interrogation by a suitable analytical technique, eg one of the known techniques mentioned above, to determine the relative amount of reactant gas converted into product gas. The solid material is suitably consigned to the appropriate waste destination after its radioactivity has been monitored and/or permitted to fall below a border level.

In the United Kingdom, for example, the border level between LLW and ILW is approximately 12 Gigabecquerels per tonne of waste for beta and gamma emissions and 4 Gigabecquerels per tonne for alpha emissions and the border level between LLW and de-minimus waste is orders of magnitude lower (with certain provisos depending on certain factors such as the manner and place of storage, the nature of the activity etc).

According to a second aspect of the present invention the solid may comprise a convoluted items having sites of obscured contamination and the process of the present invention includes filling the item with a chemically stable non-volatile reactant liquid which is converted by nuclear radiation to a chemically stable non-volatile product liquid. Desirably, reactant liquid has density greater than that of water whereby if any water is present on the surface to be assayed, the water will be displaced from the surface.

The said item may comprise a containment, glovebox or pipework or other radioactive plant component which is being monitored to determine whether it is to be classified as intermediate level waste, low level waste or de-minimus waste. Alternatively, the item may be monitored to determine whether its containment may safely be broken.

The reactant liquid may comprise a simple hydrocarbon or a halogen-substituted hydrocarbon or a mixture of such compounds. Desirably, the reactant liquid comprises a chlorofluorocarbon.

Trichlorotrifluoroethane is preferred as the reactant liquid and the action of nuclear radiation on parent trichlorotrifluoroethane molecules is to produce molecules larger than the parent molecules eg by addition of $CF_2$ and/or $CFCl$ units. Detection of species of larger mass than the parent species is therefore possible using a mass spectrometer.

In use of the process of the second aspect of the present invention, the item, such as a glovebox is filled with the reactant liquid and left for a suitable period of time which may be several hours, but could be several days or even several weeks. Any residual radioactive material in the glovebox will cause a chemical change in the reactant liquid. Samples of liquid are taken from the glovebox and analysed by a suitable technique such as gas liquid chromatography followed by mass spectrometry. The radioactive content of the glovebox may be determined from the quantity of the various chemical compound products produced in the reactant liquid.

Examples of the manner in which a reactant gas may be irradiated to form a product gas and analysis of the concentration of the product gas may be employed to indicate the level of irradiation will now be described with reference to the accompanying drawings in which.

A sample of each of a series of suitable reactant gases was sealed into a thin plastics gas sampling bag which was then sealed in a cardboard box. The bags were interspaced with pieces of paper. The box was then subjected to various doses of beta radiation from a commercial electron beam source of known energy level, viz 40 MeV. The irradiation doses were selected to be successively 4 MRad, 2 MRad, 1 MRad and 0.5 MRad. The sampled reactant gases in the bags were the specific reactant gases listed above. Each gas included the impurity $CClF_3$ in a concentration of parts per million.

A GCMS system was programmed so that the oven temperature started at 40° C. and remained at that temperature for 1 minute before rising to 100° C. at a rate of 5° C. per minute. The temperature then remained at 100° C. for a further five minutes.

The samples after irradiation were injected via a gas syringe onto the column. 10 microlitres of sample was injected. The results were printed and analysed.

The results obtained using as reactant gas bromotrifluoromethane are summarised in Table 1 as follows. In Table 1 the figures given in each of the second to fourth columns are the peak areas observed from the mass spectrometer prints at different dose levels which indicate the concentration of the relevant components. Scan 171 represents $CF_3Br$, Scan 177 represents $CF_4$ and Scan 230 represents $CClF_3$.

TABLE 1

| | Peak Area Data For Selected Compounds | | | |
| --- | --- | --- | --- | --- |
| Dose | Scan 171 | Scan 177 | Scan 230 | Ratio $177/230$ |
| 4 MRad | 38852 | 17097 | 7254 | 2.4 |
| 2 MRad | 39422 | 10691 | 8682 | 1.2 |
| 1 MRad | 41206 | 6244 | 7992 | 0.75 |
| 1/2 MRad | 36890 | 3385 | 9288 | 0.36 |
| 0 MRad | 49302 | Nil | 7462 | — |

Figure 1:
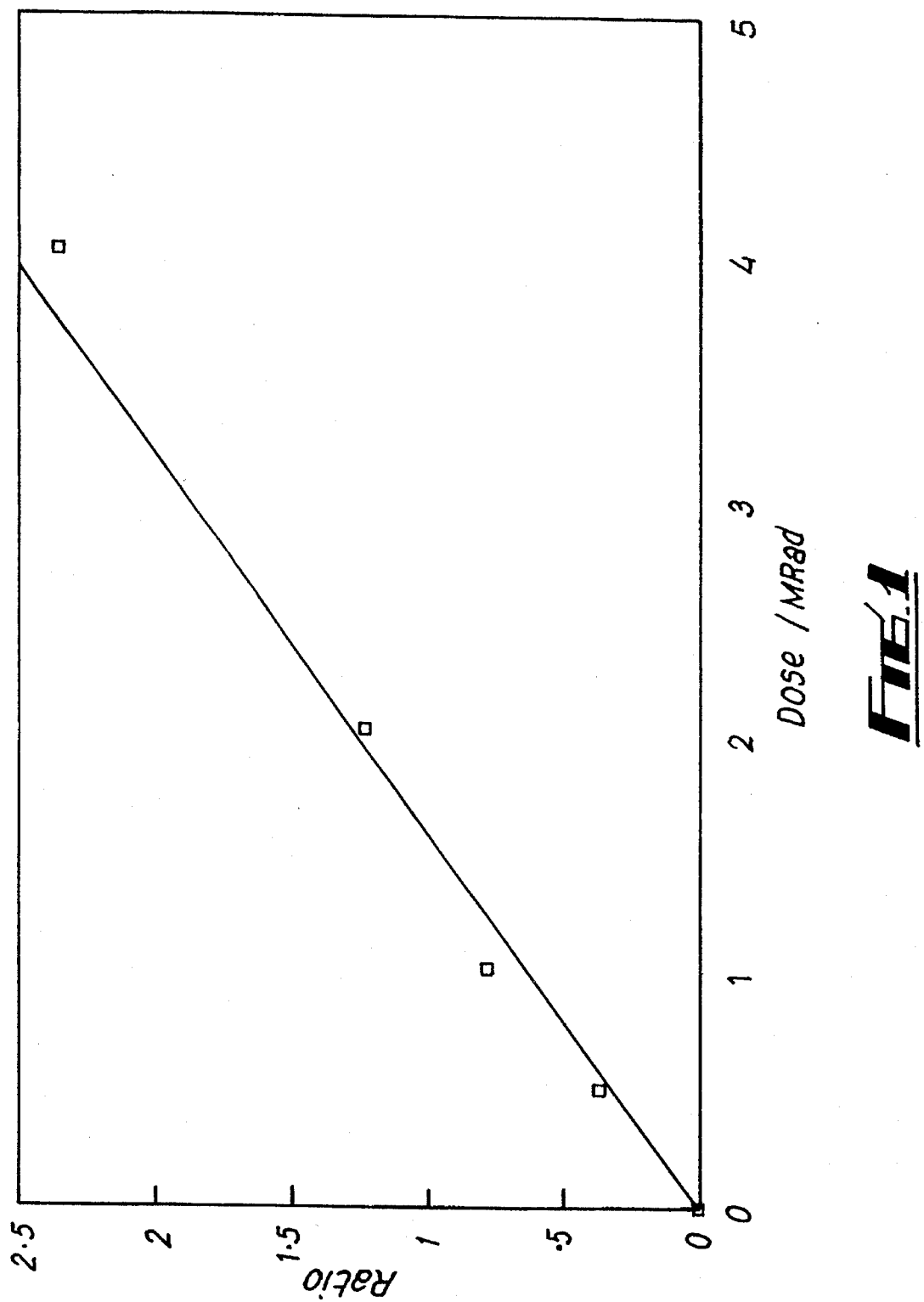
FIG. 1 is a graph of ratio of product gas to internal standard gas versus dose for an irradiated gas sample.

A graph of the ratio of the peak area figure obtained for Scan 177 to the peak area figure obtained for Scan 230 as tabulated in Table 1 was plotted against the applied dose and the result is shown in FIG. 1. Reference to the linear plot shown in FIG. 1 may be used therefore to provide a calibration plot to enable the dose providing a given Scan 177:Scan 230 ratio to be calculated.

The dose figure is a measure of the irradiation, for a given period of exposure, provided by a source of given activity level.

Figure 2:
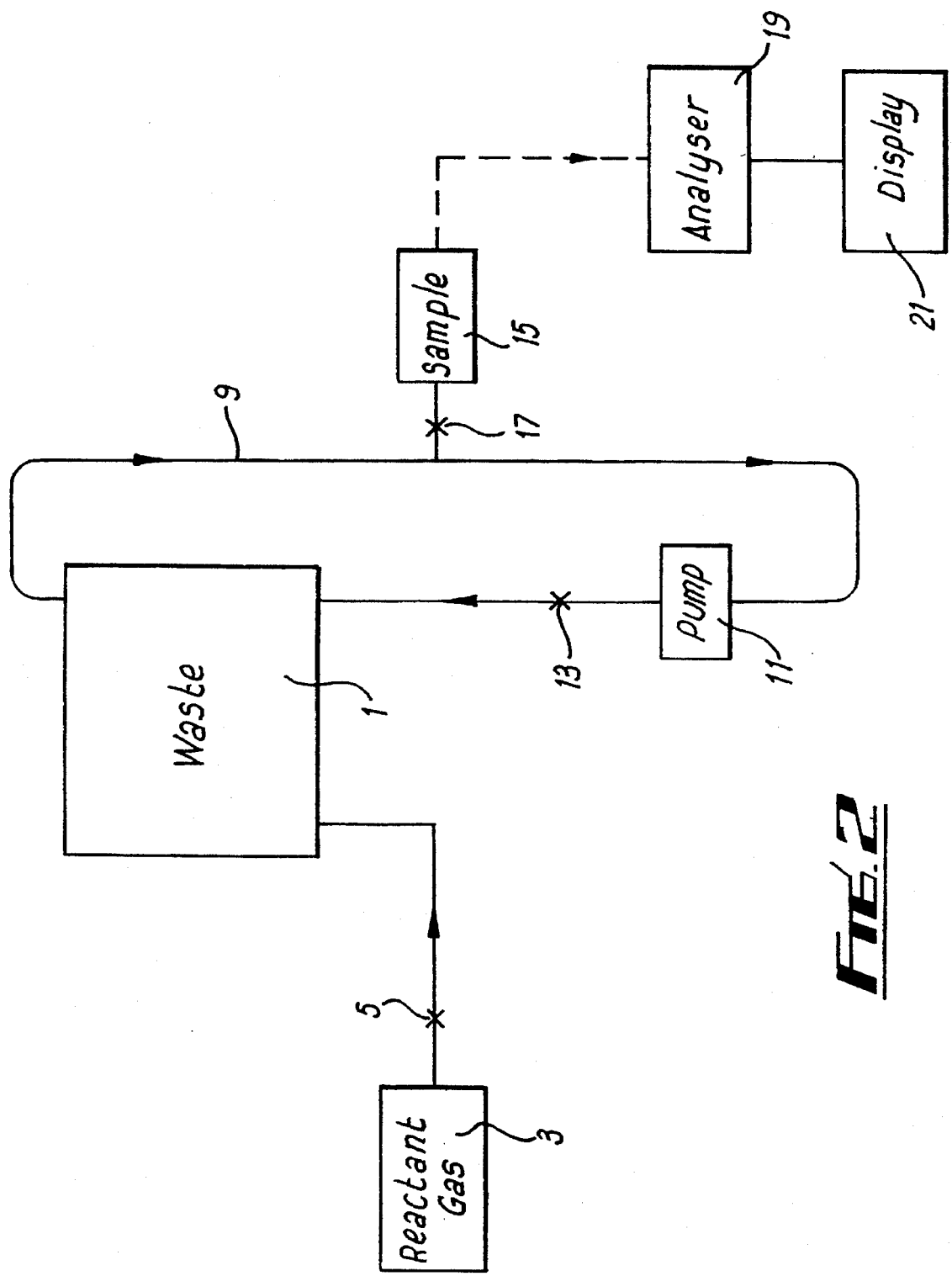
FIG. 2 is a block schematic diagram of an arrangement for monitoring the radioactivity of solid waste material by a method embodying the first aspect of the present invention.

FIG. 2 shows an arrangement for monitoring the radioactivity level of solid waste material held in a container 1 by a method embodying the present invention. Reactant gas from a source 3 is admitted into the container 1 via a valve 5. The container 1 is sealed with the gas added and left for a suitable period of time. Periodically, the added gas is recirculated within the container by the action of a pressure pulse from a pump 11 in a loop 9 containing a valve 13. Eventually, a sample of the gas from the container 1 is extracted from the loop 9 when the pump 11 is operating. The sample is diverted to a sample container 15 via a valve 17. The gas held in the sample container 15 is subsequently made the subject of analysis in an analyser 19, eg a GCMS system, the result of the analysis either as a numerical value indicating activity level or as a activity classification, ie above or below a given level, is displayed on a display 21.

I claim:

1. A process of measuring the level of radioactivity of a solid sample comprising the steps of:
   (a) contacting the solid with a reactant fluid selected from the group consisting of methane, ethane, ethylene, propane, propene, butane, methyl bromide, ethyl bromide, hexafluoroethane, trifluoromethane, bromotrifluoromethane, and mixtures thereof which is converted by nuclear radiation to a chemically stable product fluid to an extent dependent upon the radioactive content of the solid;
   (b) detecting the amount of the reactant fluid converted into the product fluid; and
   (c) determining whether the solid sample is intermediate level waste, low level waste or de-minimus waste from the amount of reactant fluid converted into product.

2. The process as in claim 1 and wherein the solid comprises a material which is porous or has re-entrant surfaces and the reactant fluid in a gas which permeates through a sample of the said material which reactant gas is converted by nuclear radiation to a chemically stable volatile product gas.

3. The process as in claim 2 and wherein the solid sample comprises bulk solid radioactive waste material.

4. The process as in claim 2 wherein the reactant gas is permeated through the sample using a varying pressure into the re-entrant surfaces and contacts any sites of obscured radioactive contamination.

5. The process as claimed in claim 4 wherein a pressure pulse is applied at intervals after the initial application of the reactant gas to permit re-circulation through the re-entrant surfaces.

6. The process as in claim 2 wherein the sample is contained in a totally or partially sealed container.

7. The process as in claim 6 wherein components of the product gas are concentrated in a sample trap by adsorption of a desired component onto solid adsorbent.

8. The process as in claim 7 wherein the solid adsorbent comprises activated charcoal.

9. The process as in claim 7 wherein the sample trap comprises a U-shaped tube of stainless steel packed with an adsorbent.

10. The process as in claim 7 wherein components of the product gas have a low volatility and are trapped in a low temperature trap.

11. The process as in claim 2 wherein an inert gas is mixed with the reactant gas to detect non-radiolytic depletion of the reactant by measuring the relative concentration ratio of the inert gas to the reactant gas.

12. The process as in claim 2 or claim 11 wherein an internal standard gas unaffected by the radiation to be detected is added to or is present as an impurity in the reactant gas in a known concentration to enable the concentration of the product gas to be standardized.

13. The process as in claim 11 wherein the inert gas mixed with the reactant gas is employed to measure gas outleakage.

14. The process as in claim 11 wherein the inert gas if $SF_6$.

15. The process as in claim 1 wherein the reactant fluid is a liquid chlorofluoro-carbon and the solid comprises a convoluted item wherein the item is filled with a non-volatile reactant liquid which is converted by nuclear radiation to a chemically stable non-volatile product liquid.

16. The process as in claim 15 wherein the item is a containment, glovebox, pipework or other radioactive plant component.

17. The process as in claim 16 wherein the item is monitored to determine whether its containment may safely be broken.

18. The process as in claim 15 wherein the reactant liquid has a density greater than that of water.

19. The process as in claim 15 wherein the reactant liquid comprises trichlorotrifluoroethane.

* * * * *